United States Patent
Wu et al.

(10) Patent No.: US 7,039,721 B1
(45) Date of Patent: May 2, 2006

(54) SYSTEM AND METHOD FOR PROTECTING INTERNET PROTOCOL ADDRESSES

(75) Inventors: Handong Wu, Los Angeles, CA (US); Jeff Cook, Santa Monica, CA (US)

(73) Assignee: McAfee, Inc., Santa Clara, CA (US)

( * ) Notice: Subject to any disclaimer, the term of this patent is extended or adjusted under 35 U.S.C. 154(b) by 839 days.

(21) Appl. No.: 09/904,310

(22) Filed: Jul. 11, 2001

Related U.S. Application Data

(60) Provisional application No. 60/264,598, filed on Jan. 26, 2001.

(51) Int. Cl.
  *G06F 15/16* (2006.01)
  *G06F 11/30* (2006.01)

(52) U.S. Cl. .................. 709/245; 713/201

(58) Field of Classification Search ......... 709/227–229, 709/232–235, 245, 223, 250, 201; 713/200–202, 713/160, 168; 370/401, 229, 217, 225, 2, 370/4; 710/20, 36, 38, 58; 712/28, 201
See application file for complete search history.

(56) References Cited

U.S. PATENT DOCUMENTS

| | | | |
|---|---|---|---|
| 5,673,322 A | 9/1997 | Pepe et al. ................ 380/49 |
| 5,793,763 A | 8/1998 | Mayes et al. .............. 370/389 |
| 5,805,803 A | 9/1998 | Birrell et al. ........... 395/187.01 |
| 5,822,434 A | 10/1998 | Caronni et al. ............. 380/49 |
| 5,835,718 A | 11/1998 | Blewett ................. 395/200.48 |
| 5,884,272 A | 3/1999 | Walker et al. ................ 705/1 |
| 5,907,677 A | 5/1999 | Glenn et al. ........... 395/200.36 |
| 5,918,018 A | 6/1999 | Gooderum et al. ..... 395/200.55 |
| 5,961,593 A | 10/1999 | Gabber et al. ............. 709/219 |
| 6,003,084 A | 12/1999 | Green et al. .............. 709/227 |
| 6,006,264 A * | 12/1999 | Colby et al. .............. 709/226 |
| 6,052,725 A | 4/2000 | McCann et al. ........... 709/223 |
| 6,052,788 A | 4/2000 | Wesinger, Jr. et al. ...... 713/201 |
| 6,154,839 A | 11/2000 | Arrow et al. .............. 713/154 |
| 6,182,226 B1 * | 1/2001 | Reid et al. ................ 713/201 |
| 6,298,445 B1 * | 10/2001 | Shostack et al. ........... 713/201 |
| 6,321,336 B1 * | 11/2001 | Applegate et al. ......... 713/201 |
| 6,502,135 B1 * | 12/2002 | Munger et al. ............ 709/225 |
| 6,571,290 B1 * | 5/2003 | Selgas et al. .............. 709/228 |
| 6,591,306 B1 * | 7/2003 | Redlich .................... 709/245 |
| 6,704,873 B1 * | 3/2004 | Underwood ............... 713/201 |
| 6,725,378 B1 * | 4/2004 | Schuba et al. ............. 713/201 |
| 6,778,525 B1 * | 8/2004 | Baum et al. ............... 370/351 |
| 6,789,203 B1 * | 9/2004 | Belissent ................... 726/22 |
| 6,829,654 B1 * | 12/2004 | Jungck ..................... 709/246 |

OTHER PUBLICATIONS

RFC 2663 "IP Network Address Translator (NAT) Terminology and Considerations" Lucent Technologies, Aug. 1999.

* cited by examiner

*Primary Examiner*—William C. Vaughn, Jr.
*Assistant Examiner*—Jude J. Jean-Gilles
(74) *Attorney, Agent, or Firm*—Zilka-Kotab, PC; Christopher J. Hamaty

(57) ABSTRACT

A method for protecting a host located within a computer network. The method includes mapping a public host address for a public host to a secret host address for a secret host containing data accessible over the computer network. The public host address is available from a domain name system server. The method further includes receiving a request for communication with the secret host at the public host and forwarding the request from the public host to the secret host. The request is processed at the secret host which communicates over the network and the communication appears to be sent from the public host.

12 Claims, 5 Drawing Sheets

SYSTEM AND METHOD FOR PROTECTING INTERNET PROTOCOL ADDRESSES

RELATED APPLICATION

The present application claims the benefit of U.S. Provisional Patent Application Ser. No. 60/264,598, filed Jan. 26, 2001.

BACKGROUND OF THE INVENTION

The present invention relates generally to Internet Protocol (IP) addressing, and more particularly, a system and method for hiding a host IP address.

IP addresses for hosts on the Internet are publicly available by looking up host names (e.g., company.com) via a Domain Name System (DNS). The domain name system is a global network of servers that translate host names like www.company.com into numerical IP addresses, which computers on the Internet use to communicate with each other. The public availability of IP addresses for specific hosts makes them easy targets for various types of attacks, such as Denial of Service (DOS) attacks. In the connected world of the Internet, destructive individuals can create major network security problems for administrators with systems exposed to public networks. The recent denial of service attacks on many of the web's most popular sites makes this clearer than ever before. A denial of service attack occurs when a malicious attacker sends continuous TCP/IP packets to a server, which quickly take up resources until there are no more resources available and a system hang or crash occurs. Commonly the targeted site may appear unavailable to the broader Internet because of the saturation of its network segment. Denial of service attacks can result in significant loss of time and money for many organizations.

Denial of service attacks are different from most other attacks because they are not targeted at gaining access to a network or information on the network. These attacks focus on making a service unavailable for normal use, which may be accomplished by exhausting some resource limitation on the network or within an operating system or application. Denial of service attacks are most frequently executed against network connectivity. The goal is to prevent hosts or networks from communicating on the network. There are several types of denial of service attacks, which can occur at various levels. When involving specific network server applications, such as a Hypertext Transfer Protocol (HTTP) server or a File Transfer Protocol (FTP) server, these attacks can focus on acquiring and keeping open all of the available connections supported by that server, effectively locking out valid users of the server or service. Denial of service attacks can also be implemented using other Internet protocols, such as UDP and Internet Control Message Protocol (ICMP).

The most common denial of service attack is the SYN attack. This is a network level attack. The attacker sends continuous TCP SYN packets to a server. Each TCP SYN packet clogs the connection until there are no more TCP resources available. The attacker begins the process of establishing a connection to the victim machine, but does it in such a way as to prevent the ultimate completion of the connection. In the meantime, the victim machine has reserved one of a limited number of data structures required to complete the impending connection. The result is that legitimate connections are denied while the victim machine is waiting to complete phony "half-open" connections. This type of attack does not depend on the attacker being able to consume network bandwidth. The intruder may be consuming kernel data structures involved in establishing a network connection. The implication is that an intruder can execute this attack from a dial-up connection against a machine on a very fast network.

There may also be reasons for changing a public IP address. For example, it may be necessary to switch ISP (Internet Service Provider) due to network congestion, or switch networks to increase security.

Conventional security systems or firewalls attempt to protect a client's identity when requesting information on the network. Systems such as Network Address Translator (NAT) are used to hide internal IP addresses by mapping a global IP address to one or several local IP addresses. Firewalls prevent tampering with private resources by unauthorized users. A network administrator typically establishes a set of rules that specify what types of packets (e.g., from a particular IP address or port) are allowed to pass and what types are blocked. This packet filtering may be effective in dealing with the most common types of network security threats, however, it is often easy to exploit by an experienced hacker. Firewalls may also use proxies. A proxy is a program, running on an intermediate system, that deals with servers on behalf of clients. Clients which are attempting to communicate with a network that is protected by a firewall, send requests for connections to proxy based intermediate systems. The proxy relays approved client requests to target servers and relays answers back to clients. These systems generally protect the client's identity rather than providing a security mechanism for servers or hosts. Furthermore, conventional security systems generally do not protect the identity of a public IP address or support mapping between global IP addresses.

There is, therefore, a need for a system and method for protecting hosts from attacks by hiding the host IP address.

SUMMARY OF THE INVENTION

A method and system for protecting a host located within a computer network are disclosed. The method generally includes mapping a public host address for a public host to a secret host address for a secret host containing data accessible over the computer network. The public host address is available from a domain name system server. The method further includes receiving a request for communication with the secret host at the public host and forwarding the request from the public host to the secret host. Communication from the secret host to the network appears to be sent from the public host.

A computer program product for protecting a host located within a computer network generally includes computer code that maps a public host address for a public host to a secret host address for a secret host containing data accessible over the computer network. The product further includes code that receives a request for communication from the secret host at the public host and forwards the request from the public host to the secret host. The request is processed and a communication that appears to be sent from the public host is sent from the secret host to the network.

A system for protecting a host located within a computer network generally comprises a public host having a public host address available from a DNS server and a secret host having a secret host address. The secret host contains data accessible over the computer network. The public host is mapped to the secret host and is operable to forward communications received from the network to the secret host. The secret host is operable to send communication from the secret host to the network with the communication appearing to be sent from the public host.

In another aspect of the invention, a method for hiding an IP address of a computer node located within a computer network generally comprises associating an IP address for a public node with an IP address of a secret node such that only the public node has access to the IP address of the secret node. The IP address for the public node is available from a DNS server. The method further includes receiving packets from the network at the public node and forwarding the packets from the public node to the secret node. The secret node responds to the packets with the response appearing to be sent from the public node rather than the secret node.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
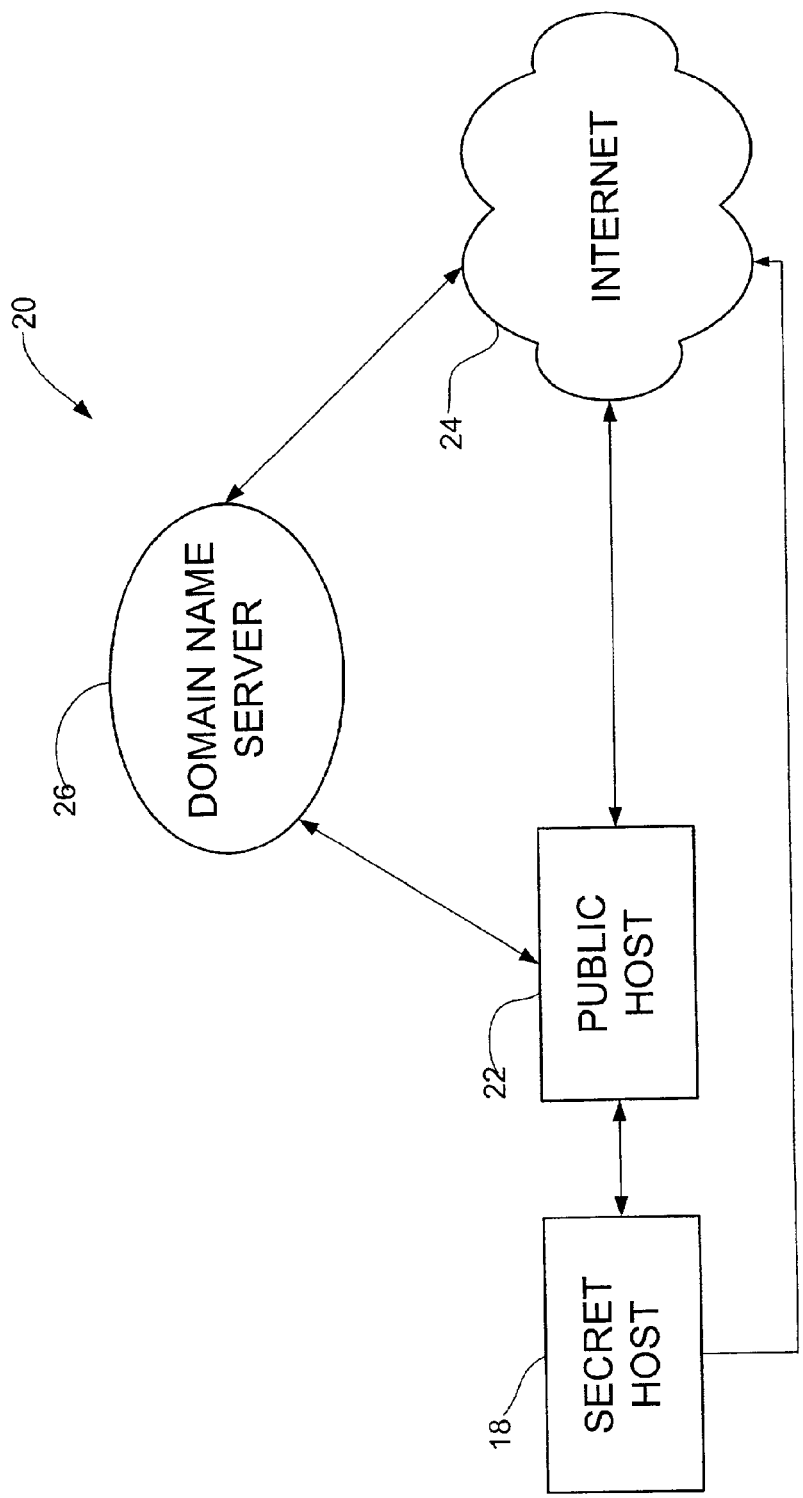
FIG. 1 is a diagram illustrating a system for protecting a secret host.

Referring now to the drawings, and first to FIG. 1, a system for preventing attacks at an IP address of a secret host 18 is shown, and generally indicated at 20. The system 20 is used to hide a node (e.g., host) IP address behind a public IP address, which may be referred to as a Post Office Box Internet Protocol (POBIP) address. The host 18 may be used, for example, to host a web site on the World Wide Web. The web site constitutes an electronically addressable location that may be used for promoting, advertising, and conducting business on the Internet. Web browsers such as NETSCAPE NAVIGATOR or MICROSOFT EXPLORER are used to access the information provided on the web site. All traffic from a network such as the Internet 24 to the secret host 22 is directed to its POBIP address host, which is the address obtained when the host name is looked up using a Domain Name System (DNS) server 26. It is not necessary that the public host 22 be a neighbor to the secret host 18. Traffic into the POBIP address is forwarded to the secret IP address of the host 18. Traffic out of the secret host 18 appears as traffic from the POBIP address even though the source is actually the secret host. This results in attacks directed at the host 18 to be instead directed at the POBIP host 22. Thus, conserving resources on the secret host 18 and allowing the secret host and POBIP host 22 to take a number of actions in the case of an attack. As described further below, these actions may include, for example, switch over to alternative POBIP host to bypass attack, investigate origin of attack, or proactively respond to the attack. The secret host 18 may also switch to another public host IP address for reasons other than an attack. For example, the system may be used for congestion control, Quality of Service (QoS) provisions, and heightened security.

The present invention operates in the context of a data communication network including multiple network elements. The network may be, for example, the Internet 24 (as shown in FIG. 1). It is to be understood, however, that the system and method of the present invention may also be used in networks which are not connected to the Internet and may be used, for example, in intranets or any other type of network. For example, the system may be used to shield an intranet from attack or used in a wireless system.

Figure 2:
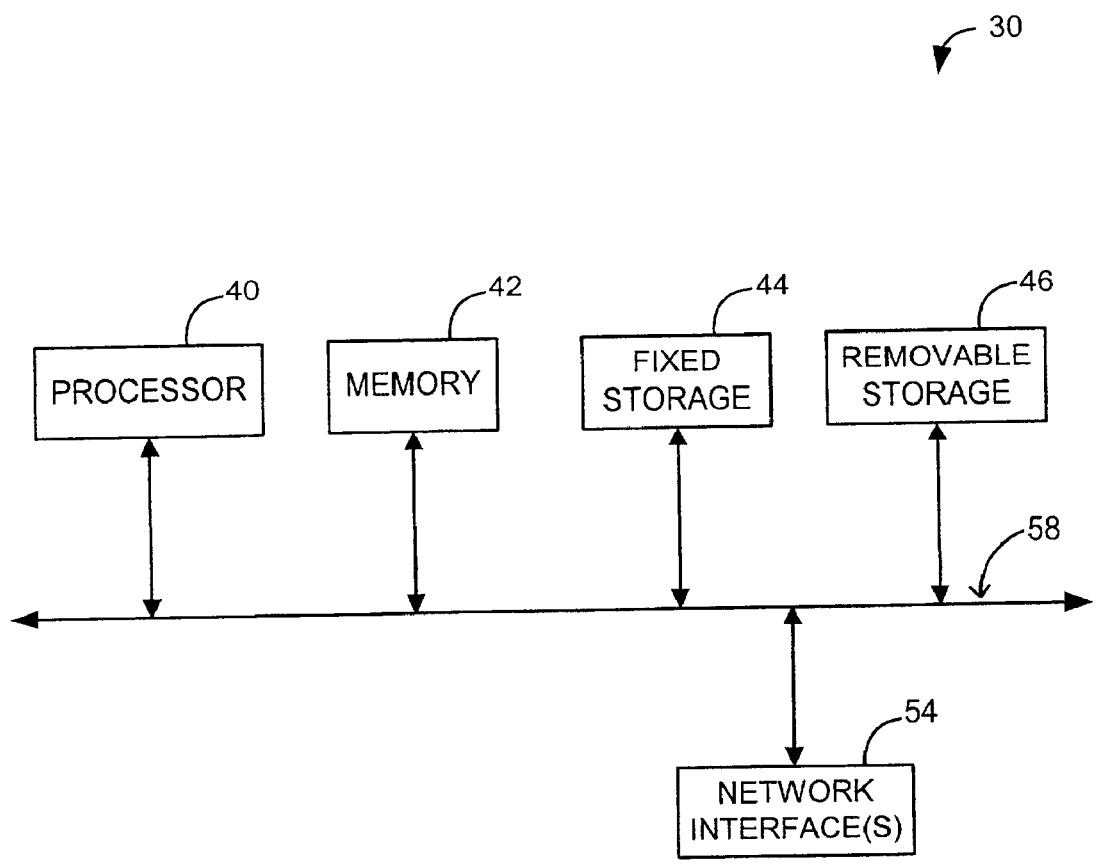
FIG. 2 is a diagram illustrating a logical architecture of a computer system that may be used to execute software of this invention.

FIG. 2 shows a system block diagram of a computer system 30 that may be used within the network to execute software of an embodiment of the invention. The computer system may include subsystems such as a central processor 40, system memory 42, removable storage 46 (e.g., CD-ROM drive), and a hard drive 44 which can be utilized to store and retrieve software programs incorporating computer code that implements aspects of the invention, data for use with the invention, and the like. The computer readable storage may also include tape, flash memory, or system memory. Additionally, a data signal embodied in a carrier wave (e.g., in a network including the Internet) may be the computer readable storage medium. The computer system 30 may further include a display screen, keyboard, and mouse which may include one or more buttons for interacting with a GUI (Graphical User Interface). Other computer systems suitable for use with the invention may include additional or fewer subsystems. For example, the computer system 30 may include more than one processor 40 (i.e., a multi-processor system) or a cache memory.

The system bus architecture of the computer system 30 is represented by arrows 58 in FIG. 2. However, these arrows are only illustrative of one possible interconnection scheme serving to link the subsystems. For example, a local bus may be utilized to connect the central processor 40 to the system memory 42. The components shown and described herein are those typically found in most general and special purpose computers and are intended to be representative of this broad category of data processors. The computer system 30 shown in FIG. 2 is only one example of a computer system suitable for use with the invention. Other computer architectures having different configurations of subsystems may also be utilized.

Communication between computers within the network is made possible with the use of communication protocols, which govern how computers exchange information over a network. The computer may include an input/output circuit used to communicate information in appropriately structured form to and from the parts of computer and associated equipment. Connected to the input/output circuit are inside and outside high speed Local Area Network interfaces 54, for example. The inside interface may be connected to a private network, while the outside interface may be connected to an external network such as the Internet. Preferably, each of these interfaces includes a plurality of ports appropriate for communication with the appropriate media, and associated logic, and in some instances memory.

Referring again to FIG. 1, the DNS server 26 is used to translate host names such as www.company.com into numerical IP addresses, which computers on the Internet use to communicate with each other. The POBIP address is provided when the host name is looked up using the domain name system. The domain name system is a distributed Internet directory service used to translate between domain names and IP addresses. The DNS server responds to browser requests by supplying name-to-address conversions. Generally, at the top of the DNS database tree are root name servers, which contain pointers to master name servers for each of the top-level domains. For example, to find out the numeric address of www.company.com, the DNS server 26 would ask the root name server for the address of the master name server for the .com domain. In response, the master name servers for each of the top-level domains contain a record and name-server address of each domain name. In order to find out the numeric address of www.company.com, the DNS server asks the .com server for the name of the server that handles the company.com domain.

The individual name servers for each domain name, such as company.com, contain detailed address information for the hosts in that domain. The DNS server 26 then asks the company.com server for the name of the server that handles the company.com domain. Finally, this most specific name server supplies the DNS server with the IP address of the public host 22 which is mapped to the secret host 18 for www.company.com. The DNS entry is known only for the front-end server thereby protecting the secret host from outside forces which may send an attack.

For example, the public host 22 may be www.nai.com and have a corresponding IP address of 192.62.40.1. The public host 22 may be directly mapped to a secret host 18 having an IP address of 192.48.58.9. The DNS server 26 is only aware of the IP address of the public host 22 and does not know the IP address of the secret host 18. Thus, when the DNS server 26 receives a request for data from the www.nai.com web site, it directs the request to the IP address of the public host 22 (i.e., 192.62.40.1).

During normal operation, the public host 22 forwards all requests to the secret host 18. Requests for communication with the secret host 18 may include, for example, a request for data from the host, request for processing, calculations, or another service by the host, or merely a request for connection with the host. In response to communications with the secret host 18, the host may send data, results from requested processing, or a confirmation that a service has been performed, for example, back to the source of the request. Even though the communication is sent from the secret host 18, the communication appears to be sent from the public host 22.

If an attack is detected at the public host 22, it may slow down the forwarding of requests, filter the requests, or shut down all forward operations. This may depend on the amount of resource consumption or memory consumed by the attack. For example, parameters to monitor may include number of connections, buffer usage, CPU utilization, or other applicable parameters. When the public host 22 shuts down its forward operation, it preferably notifies the secret host 18 that it is no longer forwarding requests or messages due to an attack.

Figure 3:
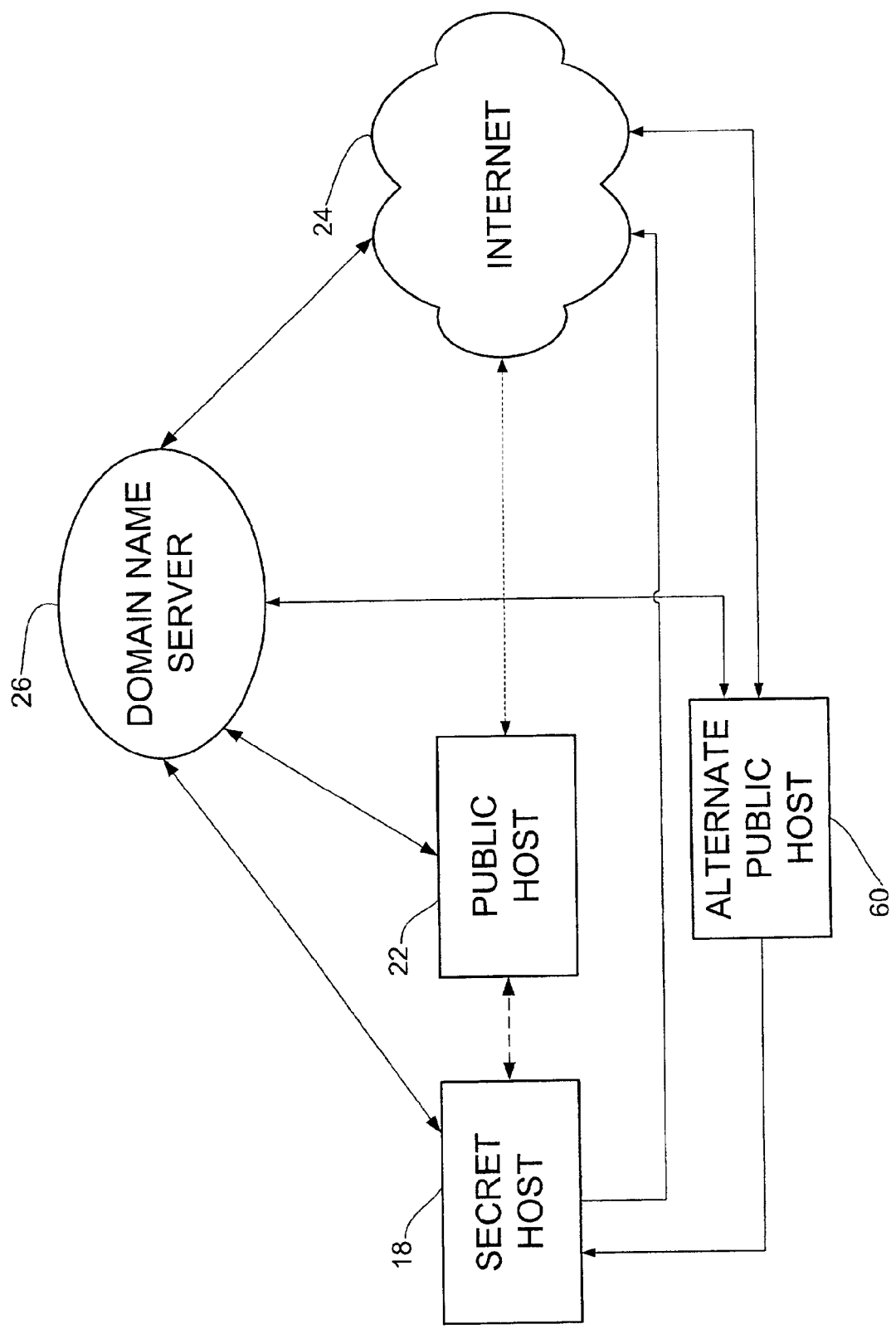
FIG. 3 is a diagram illustrating an alternate host for use when a public host of FIG. 1 is under attack.

The secret host 18 accepts IP packets from the public host 22 and processes them accordingly. The secret host 18 responds to requests by sending packets out with the public host IP address so that it appears that all data is coming from the public host 22 when it is actually being sent directly from the secret host. This further protects the identity of the secret host 18. When the secret host 18 receives notification from the public host 22 that it is under attack, it may perform a number of actions. For example, the secret host 18 may be used to track down attackers. This may be accomplished by a trace back method by installing probes and sending queries to the probes to identify the source of the attack, or any other method to track down the source of attack, as is well known by those skilled in the art. If the source of the attack is identified, the public node 22 may then filter out packets received from this source. The secret host 18 may also notify select clients that the public host 22 is shut down and provide the IP address of an alternate public host 60, as shown in FIG. 3. The secret host may also send a message to the DNS server 26 requesting that it replace the IP address of the public host 22 with the IP address of the alternate host 60. The alternate host 60 then forwards packets to the secret host 18. The alternate host 60 may be used as a backup for a single public host or may act as a backup node for more than one public host.

Management of the public host 22 may be performed by the secret host 18, an ISP, or other external management system. The path shown in FIG. 1 between the secret host 18 and public host 22 may thus provide both data and control.

Figure 4:
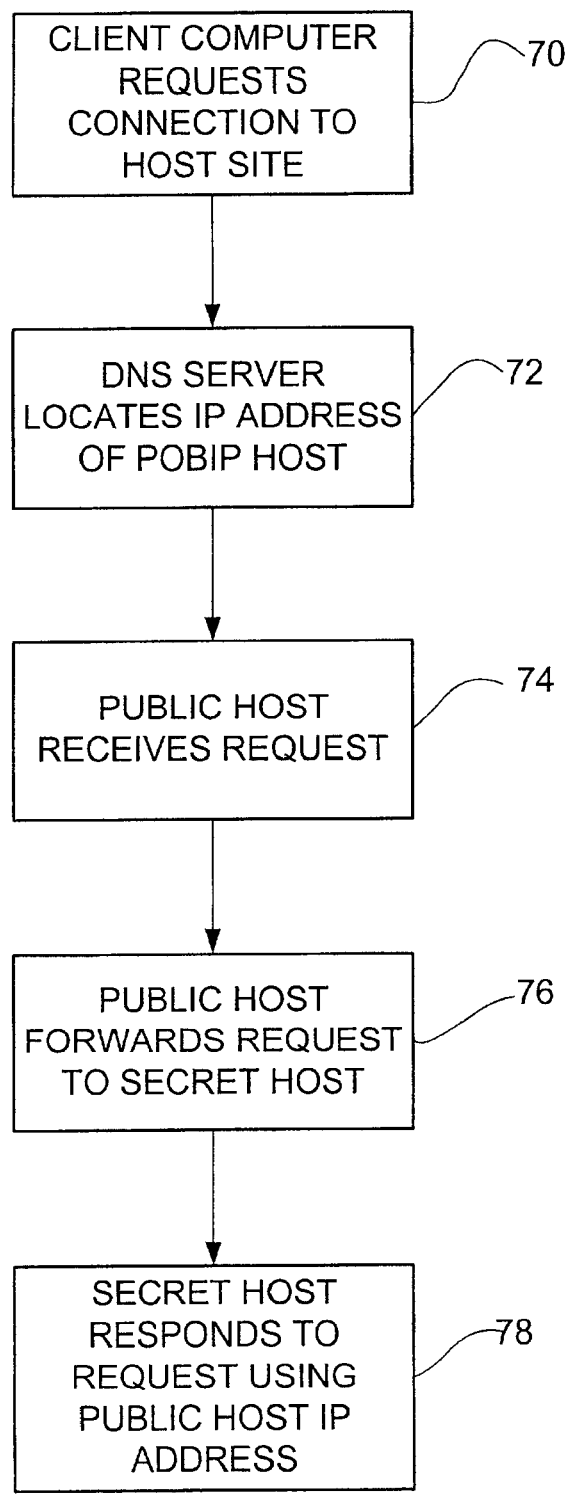
FIG. 4 is a flowchart illustrating a process for protecting a secret host.

FIG. 4 is a flowchart illustrating a process of the present invention for protecting the IP address of a secret node. A user wanting to access the secret host web site types in a URL at his computer or Internet device and a browser loaded in the computer sends a request to the closest name server (step 70). The DNS server 26 then locates the IP address of the POBIP host 22 (step 72). The name server 26 may locate the IP address in its cache if it recently received a request for the same host name or use a resolver and ask a server farther up the tree to find the address. The DNS server then provides the IP address of the public host 22 to the client computer. The public host 22 receives the request and forwards the request to the secret host 18 (steps 74 and 76). The secret host 18 then responds to the request by sending packets directly to the network, without having to pass through the public host 22 (step 78). These packets appear to be sent from the public host 22 rather than the secret host 18. The secret host 18 may also communicate back to the network through the public host 22. In this case, the public host 22 can ensure that the secret host IP address is converted to the public host IP address, instead of having the secret host perform this operation.

Figure 5:
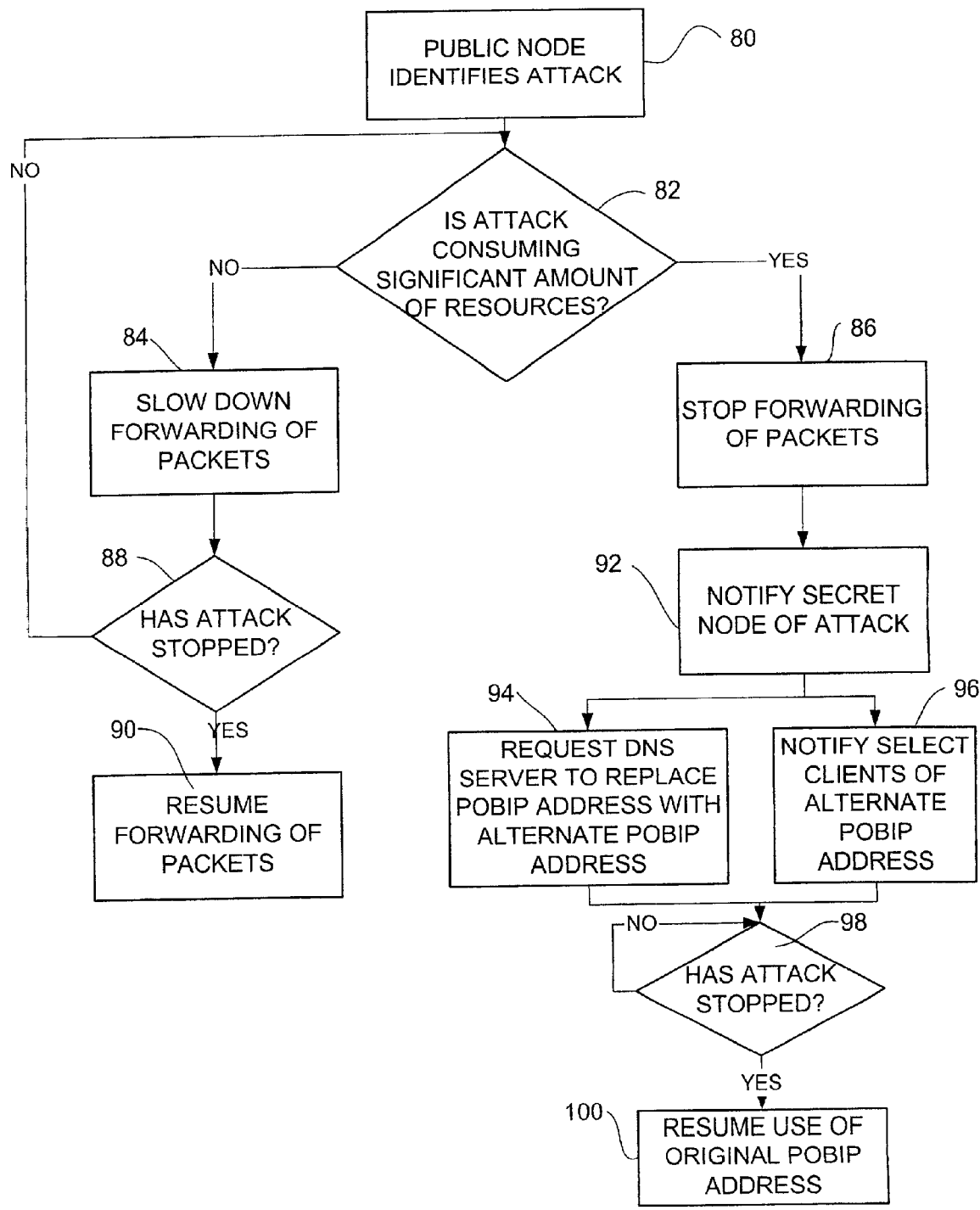
FIG. 5 is a flowchart illustrating a process for utilizing an alternate public host when the public host is under attack.

FIG. 5 is a flowchart illustrating a process of the present invention for utilizing alternate public node 60 when the first public node 22 is under attack. At step 80 the public node 22 senses that it is under attack. This may be sensed by measuring resource consumption or memory consumption at the public node 22. Depending on the extent of the attack, the public node may either slow down the forwarding of packets to the secret node or completely stop the forwarding of packets (steps 84 and 86). The public node 22 may resume the forwarding of packets once the attack as stopped (steps 88 and 90). If the forwarding is stopped, the public node 22 notifies the secret node 18 of the attack at step 92. The secret host 18 may then notify select clients of an alternate public node IP address (step 94) or request that its DNS server replace the current public node IP address with the IP address of the alternate public node (step 96). The secret host may also attempt to track down the source of the attack. Once the attack has stopped, the IP address of the alternate POBIP host 60 may be replaced with the original public host 22 (steps 98 and 100).

As can be observed from the foregoing, the system and method of the present invention provide numerous advantages. The POBIP node hides the secret IP address of the secret node, thus conserving resources of the secret node during an attack directed at the secret node. The system and method thus may be used to enhance availability of a host and enhance quality of service.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for protecting a host located within a computer network, the method comprising:
    mapping a public host address for a public host to a secret host address for a secret host containing data accessible over the computer network, said public host address being available from a domain name system server;
    receiving a request for communication with the secret host at the public host;
    forwarding said request from the public host to the secret host; and
    processing said request at the secret host and communicating from the secret host over the network,
    wherein said communication appears to be sent from the public host;
    wherein forwarding said request comprises:
        determining whether an attack is consuming significant resources,
        if it is determined that an attack is not consuming significant resources, slowing down the forwarding of said request short of stopping the same, and
        if it is determined that an attack is consuming significant resources, stopping the forwarding of said request;
        wherein, after stopping the forwarding of said request, said secret host notifies select clients of an address of an alternate Post Office Box Internet Protocol (POBIP) node, and attempts to track down a source of the attack, where, after the attack has stopped, the address of the alternate Post Office Box Internet Protocol (POBIP) node is replaced with the public host address;
        wherein a notification that the public host is under attack is received at the secret host;
        wherein a notification that the public host is congested is received at the secret host.

2. The method of claim 1 wherein the network is the Internet and the secret host is a server.

3. The method of claim 2 wherein the server hosts a Web site.

4. The method of claim 1 wherein receiving a request comprises receiving a URL at the domain name system server, the domain name system server providing an IP address of the public host corresponding to the URL.

5. The method of claim 1 wherein tracking down the source of the attack comprises performing a trace back at the secret host.

6. A computer program product for protecting a host located within a computer network, comprising:
    computer code that maps a public host address for a public host to a secret host address for a secret host containing data accessible over the computer network, said public host address being available from a domain name system server;
    computer code that receives a request for communication with the secret host at the public host;
    computer code that forwards said request from the public host to the secret host;
    computer code that processes said request at the secret host and communicates from the secret host over the network, wherein said communication appears to be sent from the public host; and
    a computer-readable storage medium for storing the codes;
    wherein forwarding said request comprises:
        determining whether an attack is consuming significant resources,
        if it is determined that an attack is not consuming significant resources, slowing down the forwarding of said request short of stopping the same, and
        if it is determined that an attack is consuming significant resources, stopping the forwarding of said request;
        wherein, after stopping the forwarding of said request, said secret host notifies select clients of an address of an alternate Post Office Box Internet Protocol (POBIP) node, and attempts to track down a source of the attack, where, after the attack has stopped, the address of the alternate Post Office Box Internet Protocol (POBIP) node is replaced with the public host address;
        wherein a notification that the public host is under attack is received at the secret host;
        wherein a notification that the public host is congested is received at the secret host.

7. The computer program product of claim 6 wherein the computer readable medium is selected from the group consisting of CD-ROM, floppy disk, tape, flash memory, system memory, hard drive, and data signal embodied in a carrier wave.

8. A system for protecting a host located within a computer network, the system comprising:
    a public host having a public host address available from a DNS server; and
    a secret host having a secret host address and containing data accessible over the computer network,
    said public host address being mapped to said secret host address;
    wherein the public host is operable to forward requests received from the network to the secret host and the secret host is operable to process said requests and communicate from the secret host to the network with said communication appearing to be sent from the public host;
    wherein forwarding said requests comprises:
        determining whether an attack is consuming significant resources,
        if it is determined that an attack is not consuming significant resources, slowing down the forwarding of said requests short of stopping the same, and
        if it is determined that an attack is consuming significant resources, stopping the forwarding of said requests;

wherein after stopping the forwarding of said request, said secret host notifies select clients of an address of an alternate Post Office Box Internet Protocol (POBIP) node, and attempts to track down a source of the attack, where, after the attack has stopped the address of the alternate Post Office Box Internet Protocol (POBIP) node is replaced with the public host address;

wherein a notification that the public host is under attack is received at the secret host;

wherein a notification that the public host is congested is received at the secret host.

9. The system of claim 8 wherein the secret host is configured to manage the public host.

10. A method for hiding an IP address of a computer node located within a computer network, the method comprising:

associating an IP address for a public node with an IP address of a secret node such that only the public node has access to the IP address of the secret node, said IP address for the public node being available from a DNS server;

receiving packets from the network at the public node;

forwarding said packets from the public node to the secret node; and responding to said packets at the secret node such that a response appears to be sent from the public node rather than the secret node;

wherein the method further comprises:

determining whether an attack is consuming significant resources;

if it is determined that an attack is not consuming significant resources, slowing down the forwarding of said packets short of stopping the same;

if it is determined that an attack is consuming significant resources, stopping the forwarding of said packets;

wherein, after stopping the forwarding of said packets, said secret node requests that the DNS server replace the IP address for the public node with an IP address of an alternate Post Office Box Internet Protocol (POBIP) node, and attempts to track down a source of the attack, where, after the attack has stopped, the IP address of the alternate Post Office Box Internet Protocol (POBIP) node is replaced with the IP address for the public node;

wherein a notification that the public node is under attack is received at the secret host;

wherein a notification that the public node is congested is received at the secret host.

11. The method of claim 10 wherein the packets contain requests for data and the secret node is a server hosting a Web site.

12. The method of claim 10 wherein the packets contain e-mail.

* * * * *